J. W. POWELL.
Improvement in Galvanic Batteries.
No. 115,519.  Patented May 30, 1871.
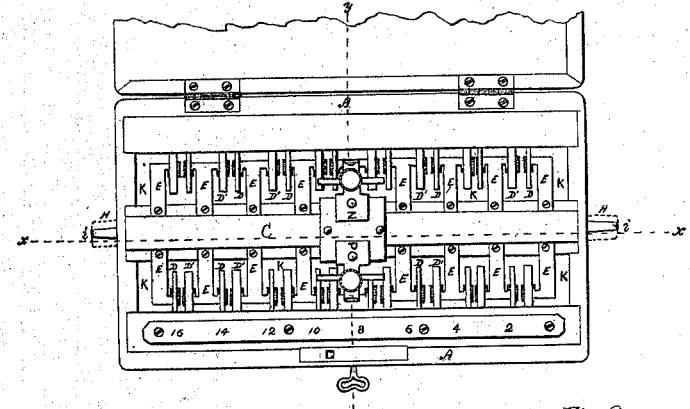
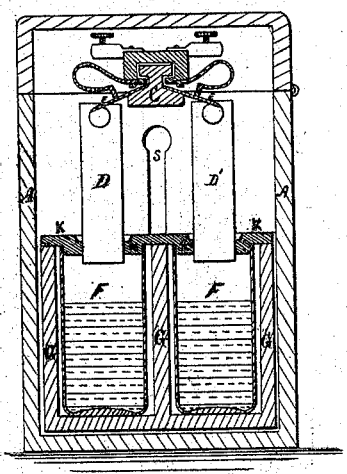
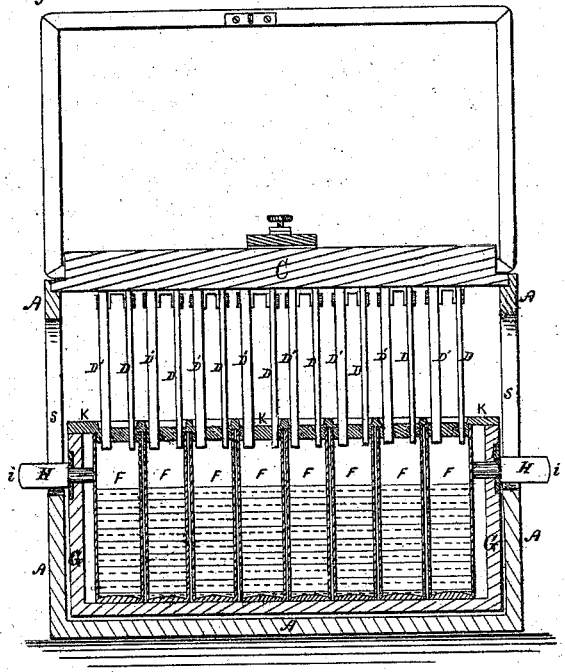
Witnesses.  
E. H. Young  
T. H. Upperman  
James W. Powell, M. D.  
Inventor  
By David A. Burr  
Atty.

UNITED STATES PATENT OFFICE.

JAMES W. POWELL, OF NEW YORK, N. Y.

IMPROVEMENT IN GALVANIC BATTERIES.

Specification forming part of Letters Patent No. 115,519, dated May 30, 1871.

I, JAMES W. POWELL, of the city, county, and State of New York, have invented an Improvement in Galvanic Machines, of which the following is a specification:

Nature and Objects of the Invention.

My invention relates to the combination of an elastic covering-plate, of India rubber or its equivalent, with the cells in an incased battery of a galvanic machine, said covering-plate being made to embrace the plates of the battery so as to bear thereon with a slight elastic pressure; the object of my invention being to prevent the fluid from escaping from the cells while the machine is being removed from place to place, and also to clean the surface of the zinc and carbon plates from any foreign matter that may be collected thereon.

The advantages obtained thereby are as follows, viz: That a physician or other person may carry the machine charged and in working order from place to place, having it always ready for use when required; and that the battery will maintain a more uniform strength, and not require charging or cleaning or taking apart so frequently as in ordinary machines, on account of the plates or zincs being kept free from foreign substances.

Description of the Accompanying Drawing.

Figure 1 represents the plan of a galvanic battery with my improvements attached, the cover of its case being thrown open; Fig. 2 represents a vertical longitudinal section of the same in line $x x$ of Fig. 1; and Fig. 3 represents a vertical cross-section thereof in line $y y$ of Fig. 1, the cover of the case being closed.

General Description.

A is the box or casing inclosing my improved galvanic battery; C, a longitudinal bar, extending centrally from end to end of the case, and supported upon the upper edges of said ends in recesses cut therein, as shown in Figs. 1 and 2. D D' are the zinc and carbon plates of the battery, arranged and suspended in pairs, as shown in Fig. 2, on either side of the longitudinal bar C, by means of suitable brackets or suspending-plates E E. F F are the cups or cells of the battery, arranged in a frame or box, G, placed in the bottom of the case A, under the suspended battery-plates D D', so that each cup may receive a pair of said plates, as illustrated in Figs. 2 and 3 of the drawing. The depth of the cups or cells F F and the length of the battery-plates are so proportioned as that, when the box or frame G in which the cells are fixed, rests on the bottom of the inclosing-case A, the lower ends of the zinc and carbon plates D D' will project slightly into the upper ends of the cells, as illustrated in Figs. 2 and 3. H H are handles projecting from the ends of the cell box or frame G, through slots $s$ (see Fig. 3) cut vertically in the ends of the inclosing-case A. By means of these handles the box or frame G may be lifted within the case, thus immersing the battery-plates into the cells, the length of the slots in which the handles work being such as that the upward movement of the box G is arrested just before the battery-plates touch the bottom of the cells. The upper ends of the slots are enlarged, and the handles are provided with buttons or knobs $i i$, arranged to revolve thereon, and so formed as that in one position they will work in the narrow portion of the slots, (see positive lines, Fig. 1,) but, by being turned in the enlarged portion, will fill the same, (see Fig. 2, and dotted lines, Fig. 1,) and thus support the inner box G in its elevated position, the battery-plates being thereby kept immersed and the battery excited to action. K is a plate or sheet, of gutta-percha, India rubber, or other equivalent elastic material not effected by acid, made to cover the cells and the box or frame containing them in such manner as to fit closely and firmly on the upper edge of each cell, and thus prevent any leakage therefrom. This gutta-percha plate is also pierced with openings, at proper intervals, to receive the zinc and carbon plates, said openings being made to embrace the plates closely, so as to press lightly on the surface of each and yet permit a free vertical movement thereof in and out of the cell beneath. The close joint of the elastic sheet K with the battery-plates prevents any leakage of the battery fluid at these points, as well as at the edges of the cells. The plate K may be made in sections to fit into the mouth of each cell, or to cover one or more cells; or otherwise, as just described, be made in one piece to fit over and rest upon the upper edges of the entire series.

Such being the construction of my improved apparatus, its operation is briefly described, as follows: The movable box C is lifted by the handles D until the zinc and carbon plates are immersed in the fluid of the battery, and it is maintained in this position by turning the handles half-way round in the circular or enlarged portion of the slots. When the battery is not required in operation the box C, with its cell, is again lowered into the position shown in the drawing. The elastic plate K, by fitting the mouths of the cells and binding closely about the zinc and carbon plates, prevents the fluid from escaping over the tops of the cells while the machine is being shaken in removing it from place to place; and it will be observed that, by the movement of said elastic plate up and down over the battery-plates, any foreign substance is rubbed off which may have collected on the latter.

Claim.

I claim as my invention—

The elastic plate K, in combination with the cells and battery-plates of a galvanic battery, fitted and arranged in reference thereto, substantially in the manner and for the purpose herein set forth.

JAMES W. POWELL.

Witnesses:
  JOHN IVES,
  C. E. TUTHILL.